United States Patent
Vasseur et al.

(10) Patent No.: US 11,677,656 B1
(45) Date of Patent: Jun. 13, 2023

(54) DETECTING PATH PERFORMANCE OSCILLATIONS USING PATH STABILITY METRICS

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US); Arnaud Quirin, Suresnes (FR)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 17/538,173

(22) Filed: Nov. 30, 2021

(51) Int. Cl.
*H04L 45/12* (2022.01)
*G06F 15/16* (2006.01)
*H04L 12/24* (2006.01)
*H04L 47/283* (2022.01)
*H04L 47/2425* (2022.01)
*H04L 45/64* (2022.01)

(52) U.S. Cl.
CPC ........ *H04L 45/124* (2013.01); *H04L 47/2425* (2013.01); *H04L 47/283* (2013.01); *H04L 45/64* (2013.01)

(58) Field of Classification Search
CPC ..... H04L 45/123; H04L 45/22; H04L 45/302; H04L 45/42; H04L 45/124; H04L 45/64; H04L 47/2425; H04L 47/283; H04L 47/2441; H04L 47/825; H04L 43/087; H04L 43/0864; H04L 43/045; H04L 43/16; H04L 43/08; H04L 41/5009; H04L 41/5022; H04L 41/5025; H04L 41/5019
See application file for complete search history.

(56) References Cited

U.S. PATENT DOCUMENTS

| | | | |
|---|---|---|---|
| 10,148,537 B2 * | 12/2018 | Vasseur | H04L 67/12 |
| 10,868,535 B2 | 12/2020 | Plusquellic et al. | |
| 11,108,651 B1 | 8/2021 | Mermoud et al. | |
| 2005/0267985 A1 * | 12/2005 | Ji | H04L 45/121 |
| | | | 709/238 |
| 2006/0007882 A1 * | 1/2006 | Zeng | H04W 40/00 |
| | | | 370/328 |
| 2013/0051236 A1 * | 2/2013 | Bush | H04L 45/302 |
| | | | 370/235 |
| 2014/0143442 A1 | 5/2014 | Vange et al. | |
| 2020/0382429 A1 | 12/2020 | Bajaj | |

OTHER PUBLICATIONS

Varadhan, Kannan et al. discloses "persistent route oscillations in inter-domain routing." Computer Networks. vol. 32, Issue 1. Elsevier Science. Jan. 2000. pp. 1-16 (Year: 2000).*

* cited by examiner

*Primary Examiner* — Rasheed Gidado
(74) *Attorney, Agent, or Firm* — Behmke Innovation Group; Kenneth J. Heywood; Jonathon P. Western

(57) ABSTRACT

In one embodiment, a device obtains telemetry data for a path in a network that is used to convey traffic associated with an online application. The device identifies, based on the telemetry data, oscillations of the path between a first state in which the path provides acceptable user experience for the online application and a second state in which the path does not provide acceptable user experience for the online application. The device determines a stability metric that quantifies the oscillations of the path. The device provides an indication of the oscillations of the path, based in part on the stability metric.

20 Claims, 15 Drawing Sheets

DETECTING PATH PERFORMANCE OSCILLATIONS USING PATH STABILITY METRICS

TECHNICAL FIELD

The present disclosure relates generally to computer networks, and, more particularly, to detecting path performance oscillations using path stability metrics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, certain paths have been found to exhibit behaviors where they oscillate between providing an acceptable application experience and not providing acceptable application experience. Such behaviors can cause a predictive routing mechanism to repeatedly recommend rerouting the application traffic, which can also impinge on the application experience.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
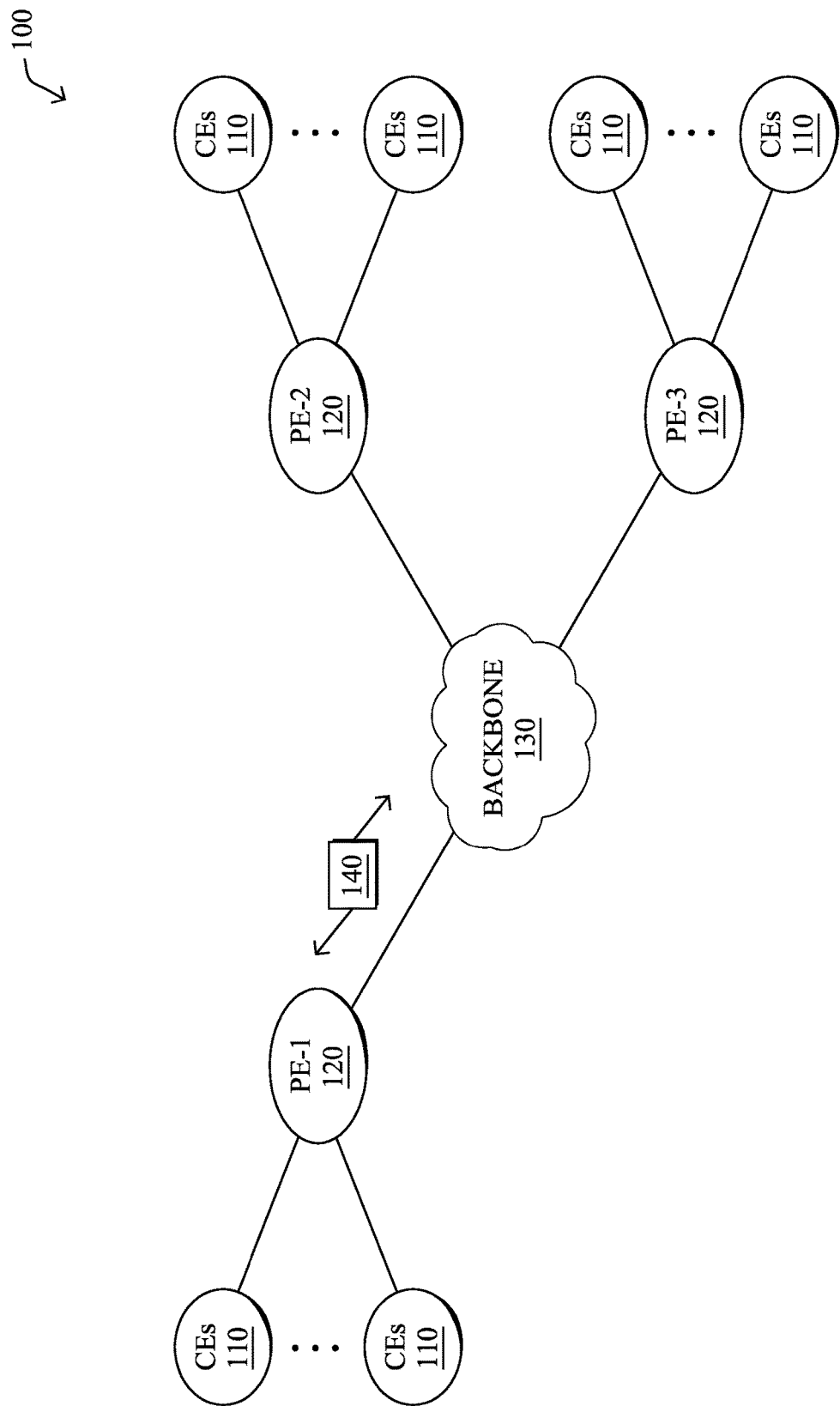
FIGS. 1A-1B illustrate an example communication network.

According to one or more embodiments of the disclosure, a device obtains telemetry data for a path in a network that is used to convey traffic associated with an online application. The device identifies, based on the telemetry data, oscillations of the path between a first state in which the path provides acceptable user experience for the online application and a second state in which the path does not provide acceptable user experience for the online application. The device determines a stability metric that quantifies the oscillations of the path. The device provides an indication of the oscillations of the path, based in part on the stability metric.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
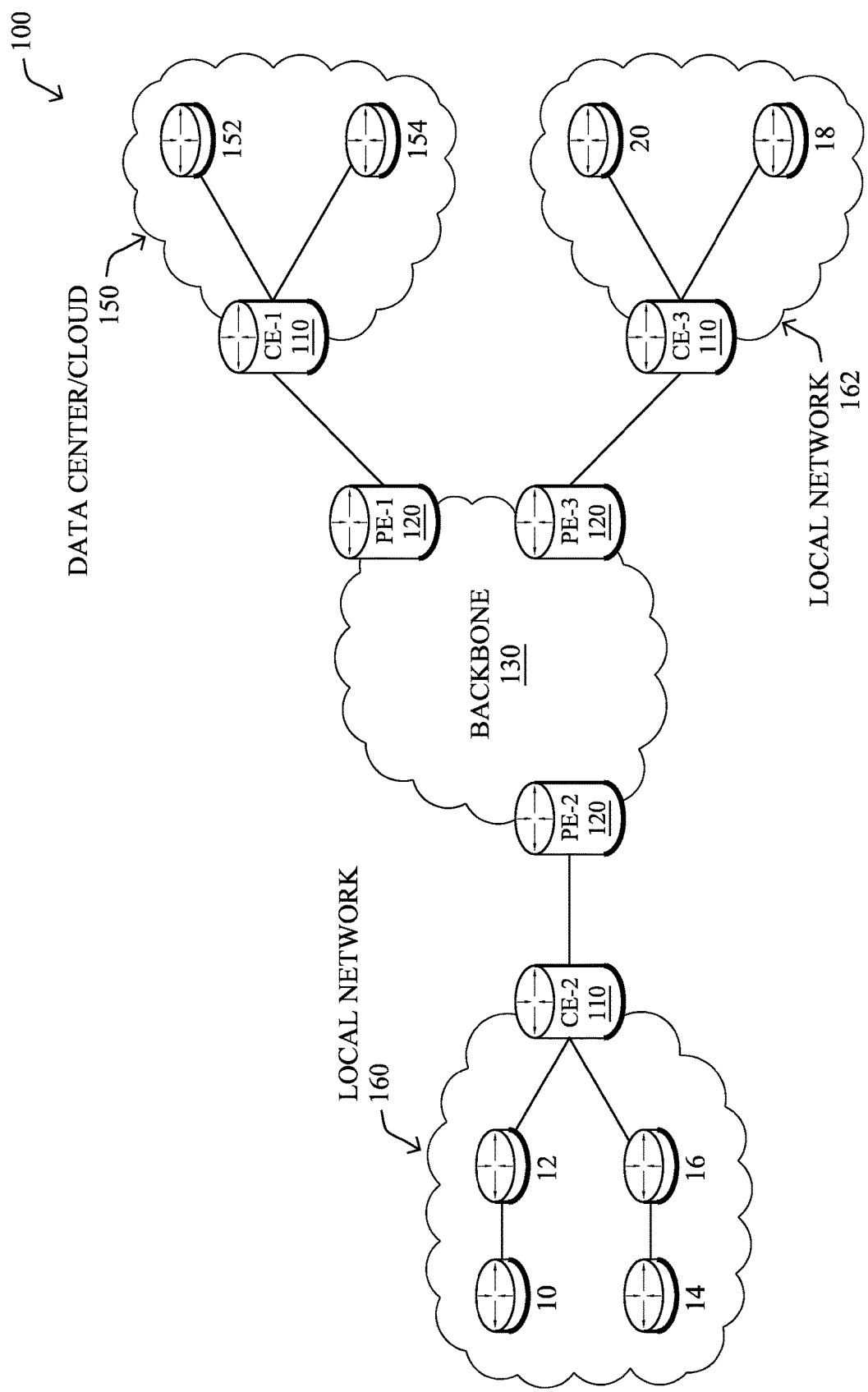

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
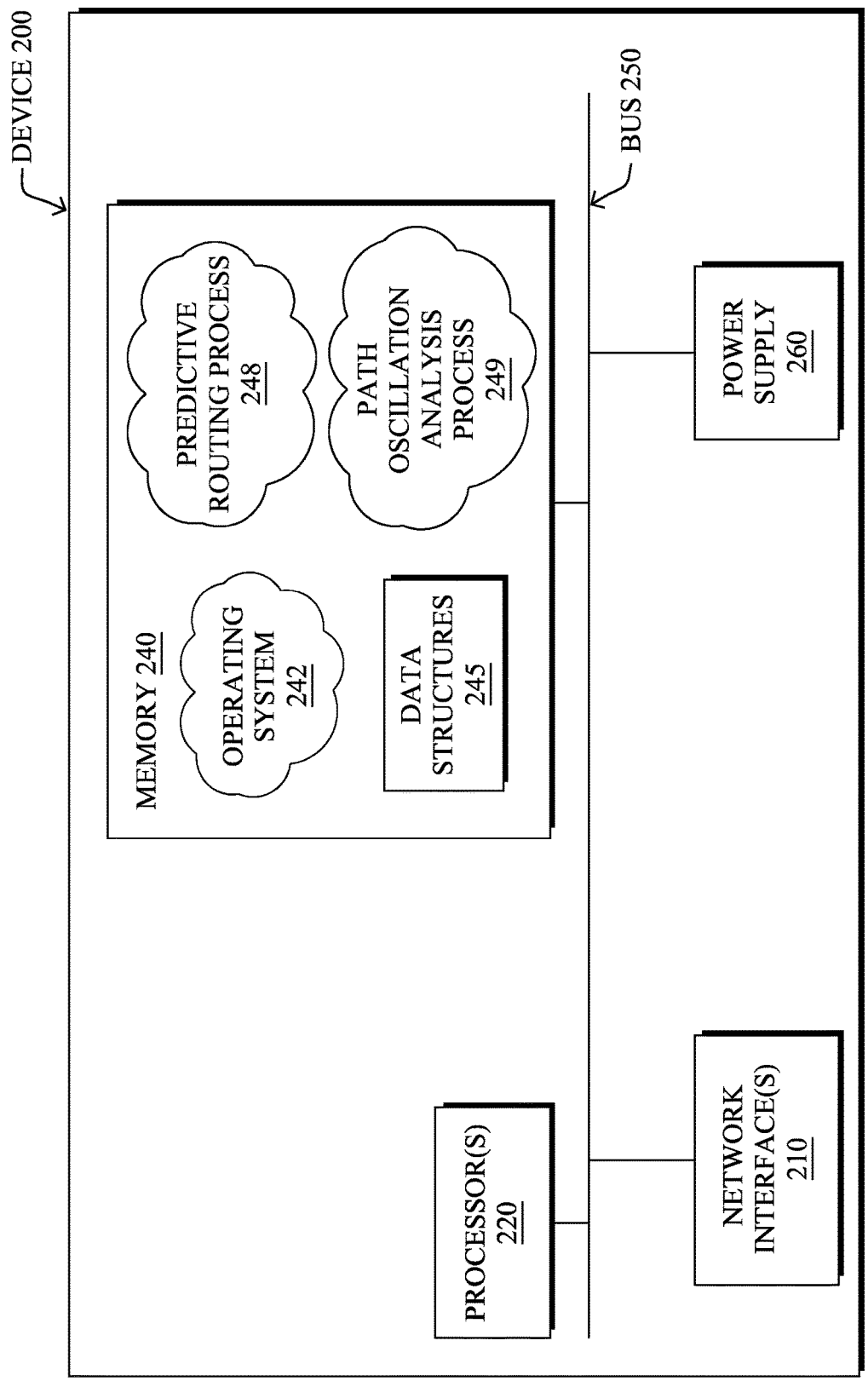
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a key performance indicator (KPI) dynamics analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or path oscillation analysis process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or path oscillation analysis process 249 may include computer executable instructions that, when executed by processor(s) 220, cause device 200 to perform the techniques described herein. To do so, in some embodiments, predictive routing process 248 and/or path oscillation analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or path oscillation analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or path oscillation analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory KPI metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
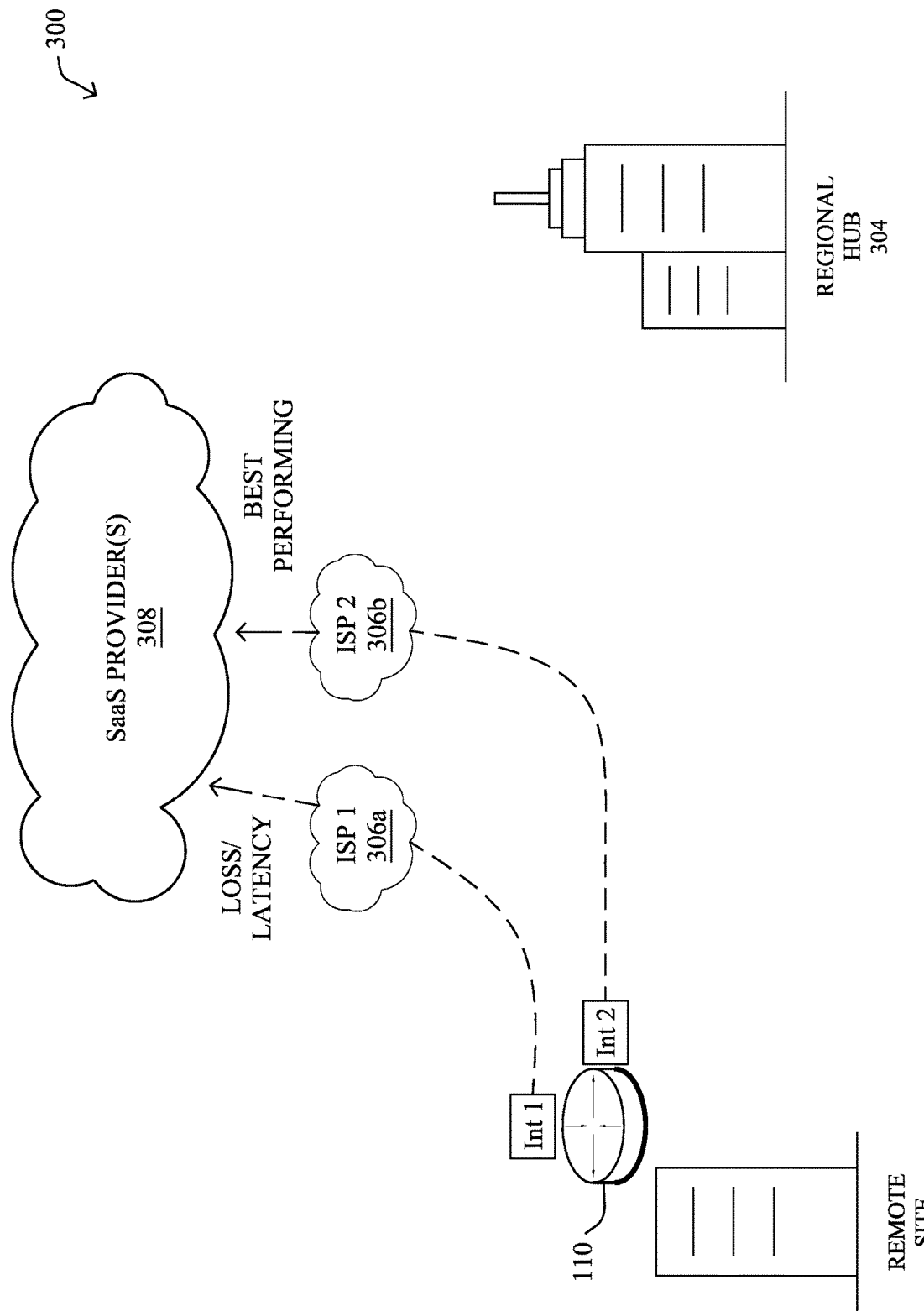
FIGS. 3A-3B illustrate example network deployments.
Figure 3B:
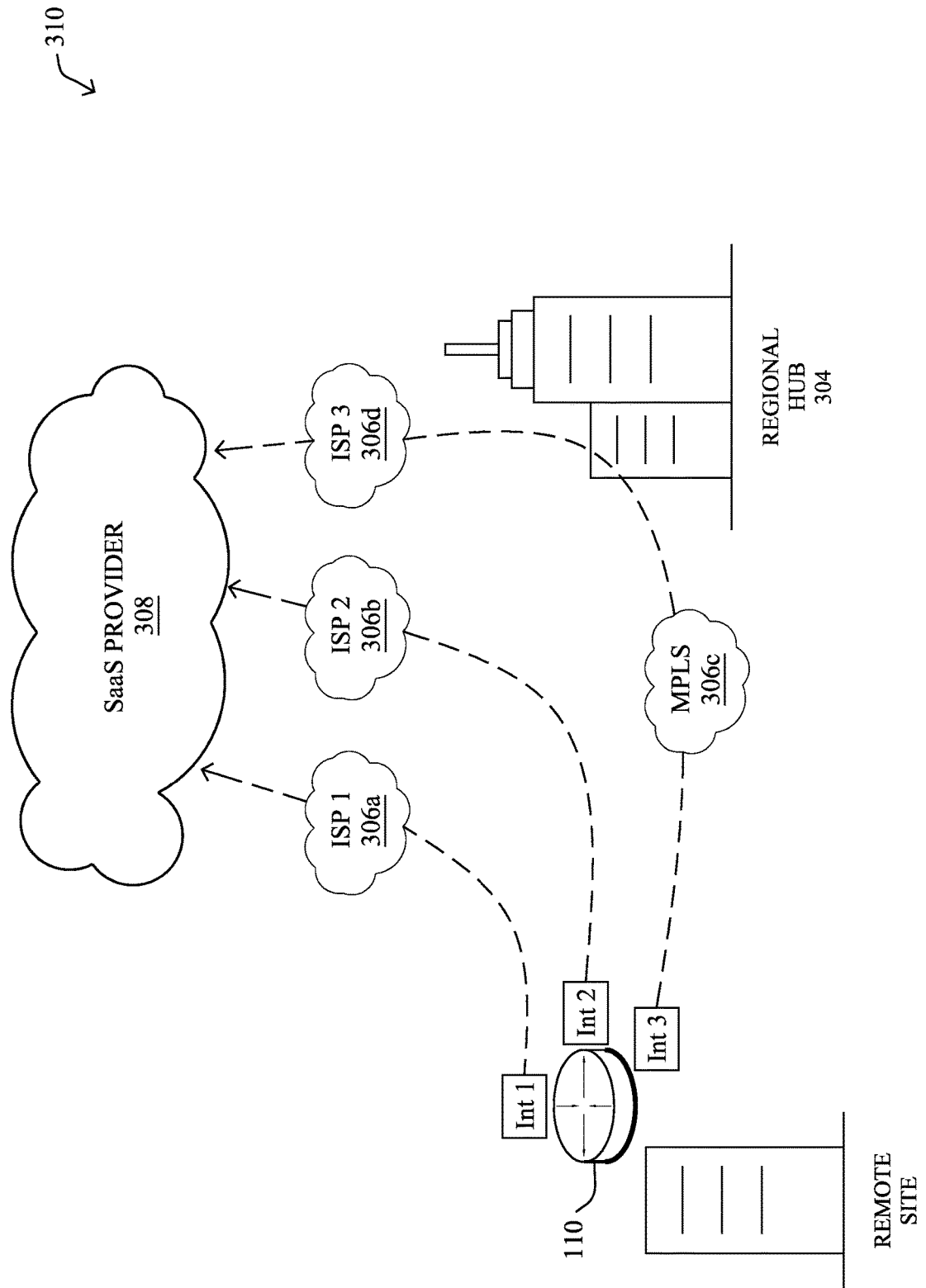

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
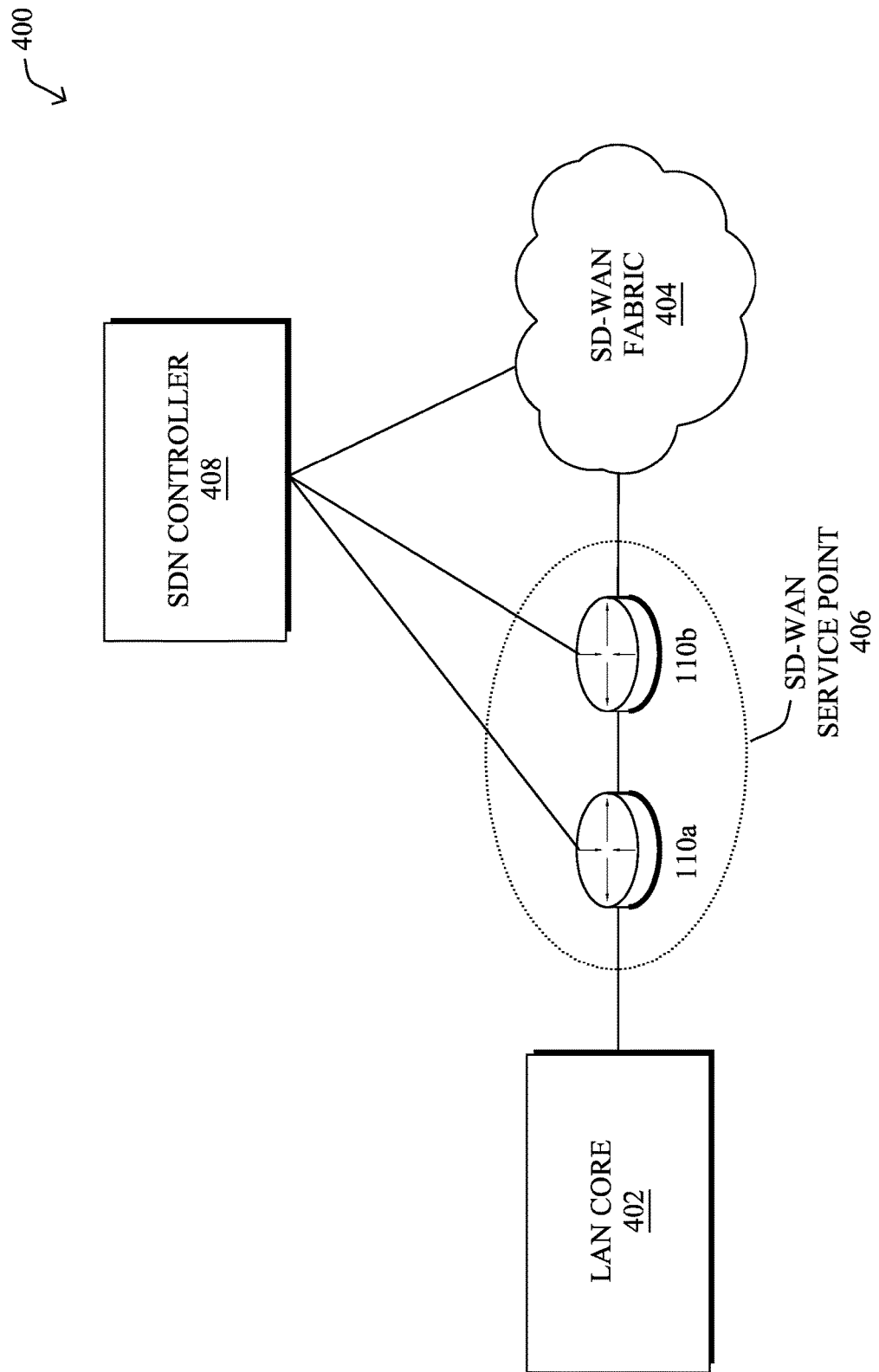
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
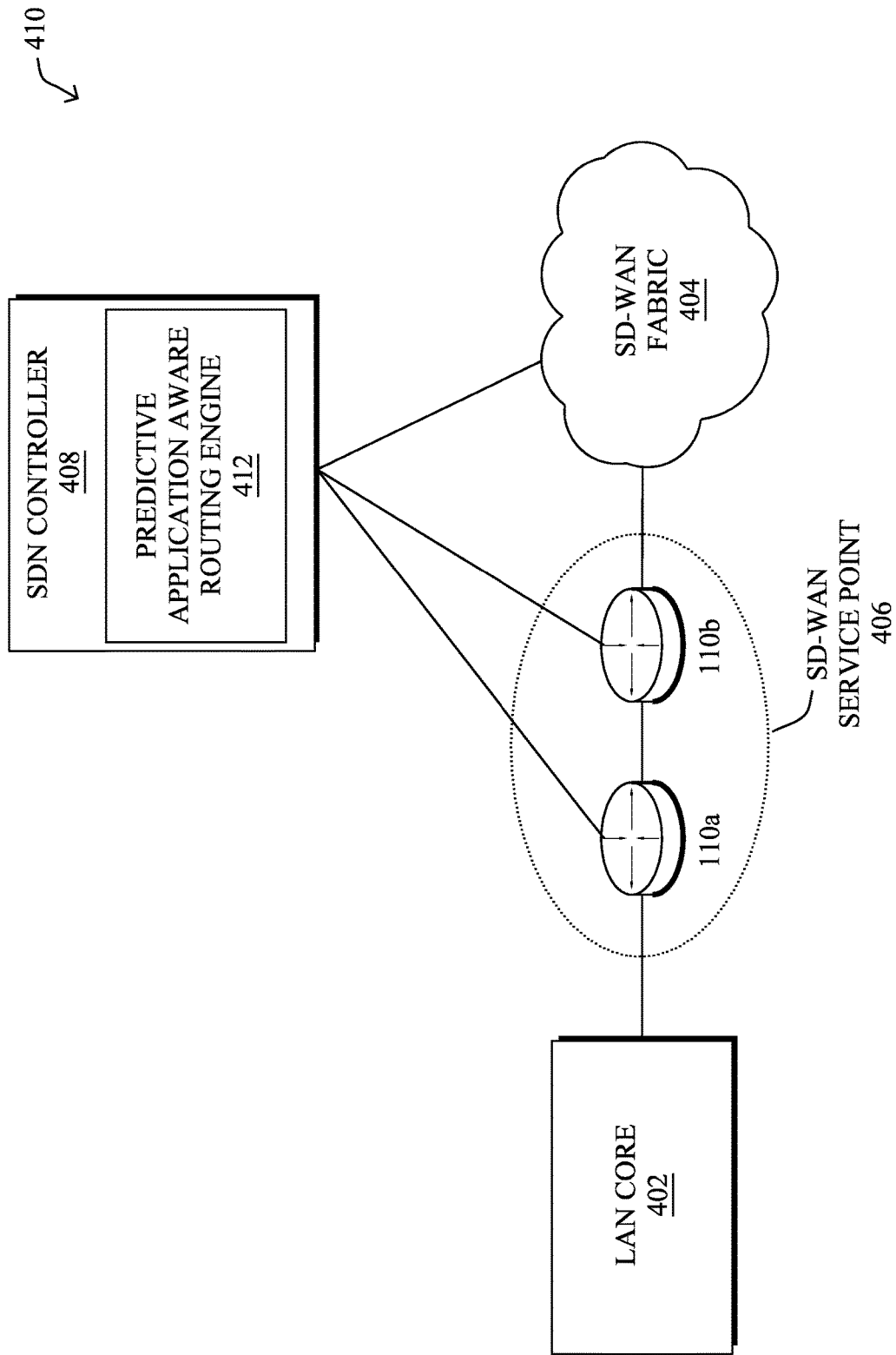

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, application-aware routing is responsible for choosing paths/routes for application traffic that best satisfies the application criteria, in an attempt to optimize the experience of users accessing an online application. This can be done based on user-supplied satisfaction ratings of the application (e.g., on a scale of 0-5 stars, etc.) and/or based on a comparison between the performance of a path and an SLA template associated with the application. For example, for transmitting voice application, the routing engine may use an SLA template (e.g., loss <3%, latency <300 ms and jitter <50 ms), to check whether a given path offers the required SLA for an application. Based on this, the routing engine may choose the path that satisfies the above criteria (or the one with lowest loss, latency and/or jitter if more than one path satisfies such a criteria). Similar rules may also be employed when using application feedback instead of path QoS metrics.

Path oscillations in which a path alternates between states that provide acceptable and unacceptable application experiences can be quite challenging in both reactive and predictive routing systems. Indeed, a predictive routing engine, such as predictive application aware routing engine 412, may repeatedly reroute application traffic onto, and off of, a path that exhibits this type of oscillating behavior.

Figure 5:
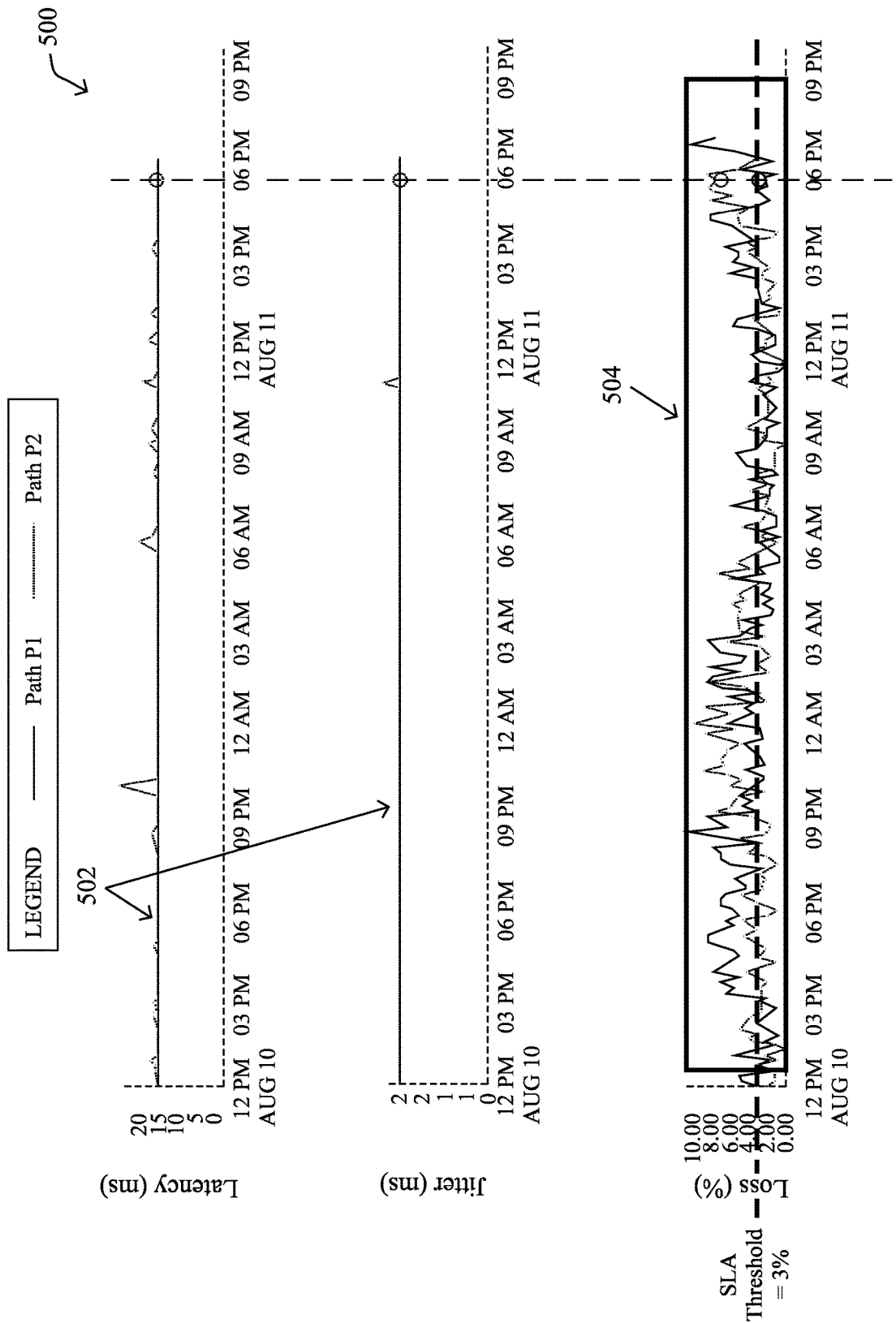
FIG. 5 illustrates an example of a path oscillating between states.

FIG. 5 illustrates an example 500 of a path oscillating between states, in some embodiments. As shown, assume that an edge router is connected to a SaaS provider (e.g., Office 365, etc.) via two Direct Internet Access (DIA) interfaces connected to different paths P1 and P2. Telemetry data indicative of loss, jitter, and latency along the two paths may be captured over time, resulting in the time series shown.

Here, it can be seen that time series 502 for the jitter and latency are stable, whereas the loss time series 504 on both paths is noisy and often significantly better or worse than the other for the application. Indeed, assume that the SLA threshold specifies that the loss should remain under 3%. Here, paths P1 and P2 may repeatedly violate this condition over time. Consequently, the routing engine may continue to alternate between routing the application traffic via P1 and via P2. Testing has shown this to be even more extreme at the thresholds of the SLA template and when the timers used to detect SLA violations are too aggressive. In addition, the problem itself is multi-dimensional and complex in nature, as SLA violations can occur as a combination of loss, latency, jitter, application feedback, or the like.

——Detecting Path Performance Oscillations Using Path Stability Metrics——

The techniques introduced herein allow for the detection of oscillations in path behaviors using various path QoS and/or application feedback metrics. In some aspects, each path may be tagged (e.g., for a specific time period) with a stability score, so as to avoid routing traffic via paths that exhibit oscillating behaviors. This can be achieved, for instance, by having an oscillation analysis process exchange messages between a central routing engine and the routers, to push information about the paths exhibiting oscillating behaviors, so that they can be avoided. Further aspects also provide for information about oscillating paths to be provided for display, allowing an administrator to perform network planning to fix the oscillating path(s) (e.g., through involvement of a service provider) or to take other measures (e.g., by adding another path, by backhauling traffic through a data center, etc.).

Illustratively, the techniques described herein may be performed by hardware, software, and/or firmware, such as in accordance with path oscillation analysis process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device obtains telemetry data for a path in a network that is used to convey traffic associated with an online application. The device identifies, based on the telemetry data, oscillations of the path between a first state in which the path provides acceptable user experience for the online application and a second state in which the path does not provide acceptable user experience for the online application. The device determines a stability metric that quantifies the is oscillations of the path. The device provides an indication of the oscillations of the path, based in part on the stability metric.

Figure 6:
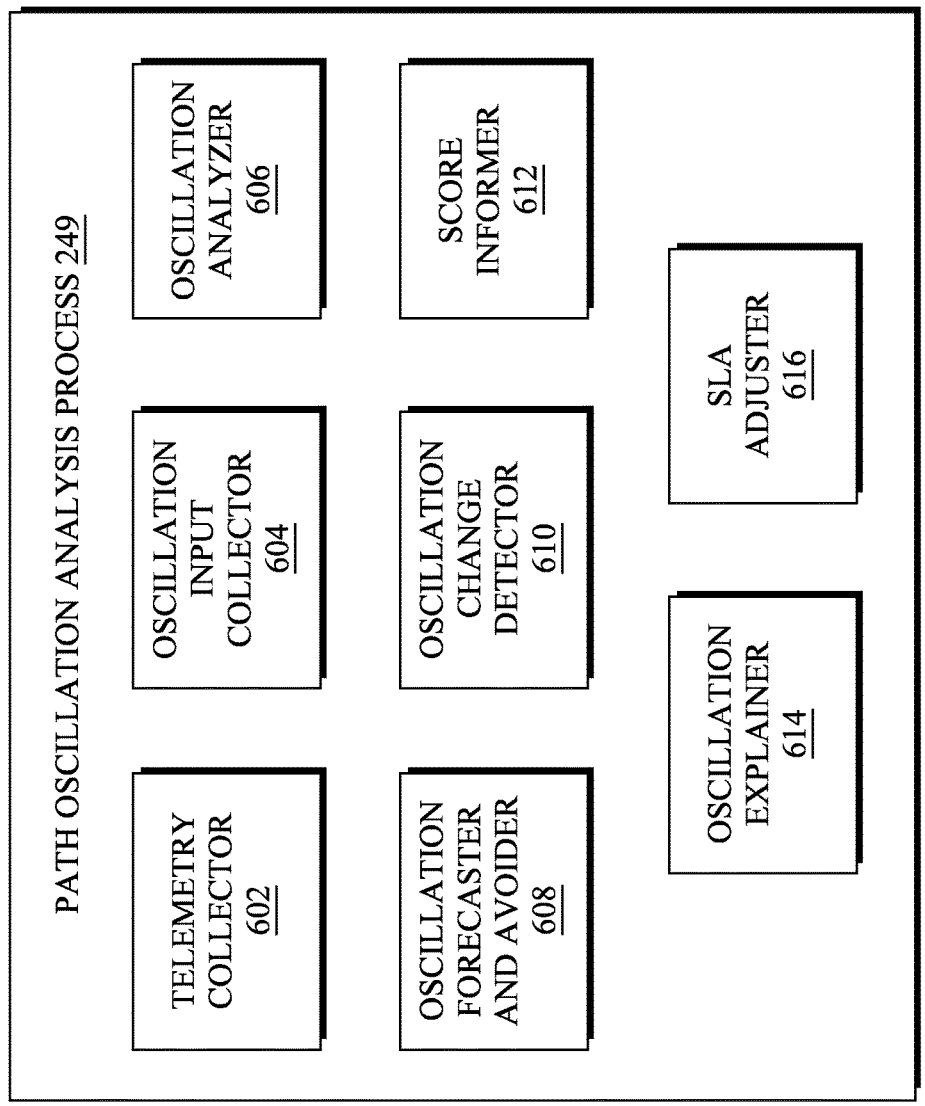
FIG. 6 illustrates an example architecture for detecting path performance oscillations.

Operationally, in various embodiments, FIG. 6 illustrates an example architecture 600 for detecting path performance oscillations using path stability metrics, according to various embodiments. At the core of architecture 600 is path oscillation analysis process 249, which may be executed by a controller for a network, a networking device, or another device in communication therewith. For instance, path oscillation analysis process 249 may be executed by a controller for a network (e.g., SDN controller 408 in FIGS. 4A-4B), a particular networking device in the network (e.g., a router, etc.), another device or service in communication therewith, or the like. In some embodiments, for instance, path oscillation analysis process 249 may be used to implement a predictive application aware routing engine, such as predictive application aware routing engine 412, or another supervisory service for the network.

As shown, path oscillation analysis process 249 may include any or all of the following components: a telemetry collector 602, an oscillation input collector 604, an oscillation analyzer 606, an oscillation forecaster and avoider 608, an oscillation change detector 610, a score informer 612, an oscillation explainer 614, and/or an SLA adjuster 616. As would be appreciated, the functionalities of these components may be combined or omitted, as desired (e.g., implemented as part of predictive routing process 248). In addition, these components may be implemented on a singular device or in a distributed manner, in which case the combination of executing devices can be viewed as their own singular device for purposes of executing path oscillation analysis process 249.

Telemetry collector 602 may collect path telemetry data for a path regarding measured KPIs such as loss, latency, jitter, etc., at a given frequency Fi for a period of time Ti along each path of interest Pi. This can be done either on a pull basis by sending a request to one or more networking devices for the telemetry data or on a push basis, where the telemetry data is sent to telemetry collector 602, automatically. In one is embodiment, telemetry could be gathered by telemetry collector 602 using time based telemetry (streaming). In another embodiment, a (more exhaustive) data gathering campaign may be triggered by telemetry collector 602 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of telemetry collector 602 may be to compute time series from the received KPI metrics for the various network paths.

If available, telemetry collector 602 may also obtain telemetry data indicative of user satisfaction scores for a given online application whose traffic is routed via a particular path. For instance, the online application itself may include a mechanism that allows users to rate their satisfaction with the performance of the online application (e.g., rating a videoconference on a scale of 0-5 stars, etc.). In other instances, user satisfaction information can be captured through agents, polling mechanisms (e.g., email, text, etc.), or the like. Regardless, telemetry collector 602 may access this information via an application programming interface (API) associated with the system responsible for capturing or reporting such information.

Telemetry collector 602 may further obtain configuration or other information for the various paths, such as their SLA templates, their path types (e.g., business Internet, MPLS, public Internet, etc.), geographic information, service provider information, etc.

Oscillation input collector 604 may be responsible for collecting control parameters from a network administrator or other user, to control how path oscillation analysis process 249 assesses the oscillation behaviors of paths. In one embodiment, oscillation input collector 604 may present display data for review by a network administrator, allowing them to specify an application of interest, as well as the QoS and/or application feedback metrics that should be considered, to detect oscillations. For example, a user may be shown the top n-number of applications in terms of their active traffic in the network.

Once the user selects the application(s), oscillation input collector 604 may show the user the path QoS metrics that are present (e.g., loss, latency, jitter for SD-WAN tunnel, and loss and latency for DIA paths to SaaS applications). This data can be fetched via telemetry collector 602. The user can also select each metric and assign a threshold used to separate a state that is considered 'good' in terms of performance/application experience and a state that is considered 'bad' in which the application experience is considered unacceptable. For instance, the SLA template for a voice application may define a 'good' state as one in which the path exhibits loss <3%, latency <300 ms and jitter <50 ms.

Alternatively, loss time series 504 may retrieve associated templates via the SDN controller. In some cases, application feedback may take the form of an ordinal value (e.g., a "GOOD" application-feedback label is better than "DEGRADED" which is, in turn, better than "BAD"). Such ordinal values can also be used by, say, transforming them to integers (e.g., GOOD=1, DEGRADED=2, BAD=3) and a threshold of label L 1 is deemed good, otherwise the application experience is deemed not acceptable. Other transformations are also possible, in further embodiments. Oscillation input collector 604 may then store the data from the administrator in a data store.

In some embodiments, path oscillation analysis process 249 may also include oscillation analyzer 606, which is responsible for analyzing paths and to compute an oscillation score/path stability metric for each path, potentially on a per-application basis. In a simple embodiment, oscillation analyzer 606 may consider historical QoS metrics for the path, and analyze the fraction of times that the path was in "good" state. In some embodiments, oscillation analyzer 606 can then assign this fraction as the oscillation score for the path. In yet another embodiment, oscillation analyzer 606 may compute the mean and standard deviation of the metrics, to check whether a path is highly noisy around the threshold for oscillation. A combination of such standard deviations across different metrics can also be used to assign an oscillation score to a path, in further embodiments.

Note that the above approaches may lead to the false detection of path is oscillations. For example, if a path was always good for an entire week and then bad for another week, then both of the above approaches will falsely tag the path as oscillating. To address this, in some embodiments, oscillation analyzer 606 may construct an n-dimensional cube for n-number of metrics of interest and compute an oscillation score based on how often a path crosses certain spaces in n-dimensions.

Figure 7A:
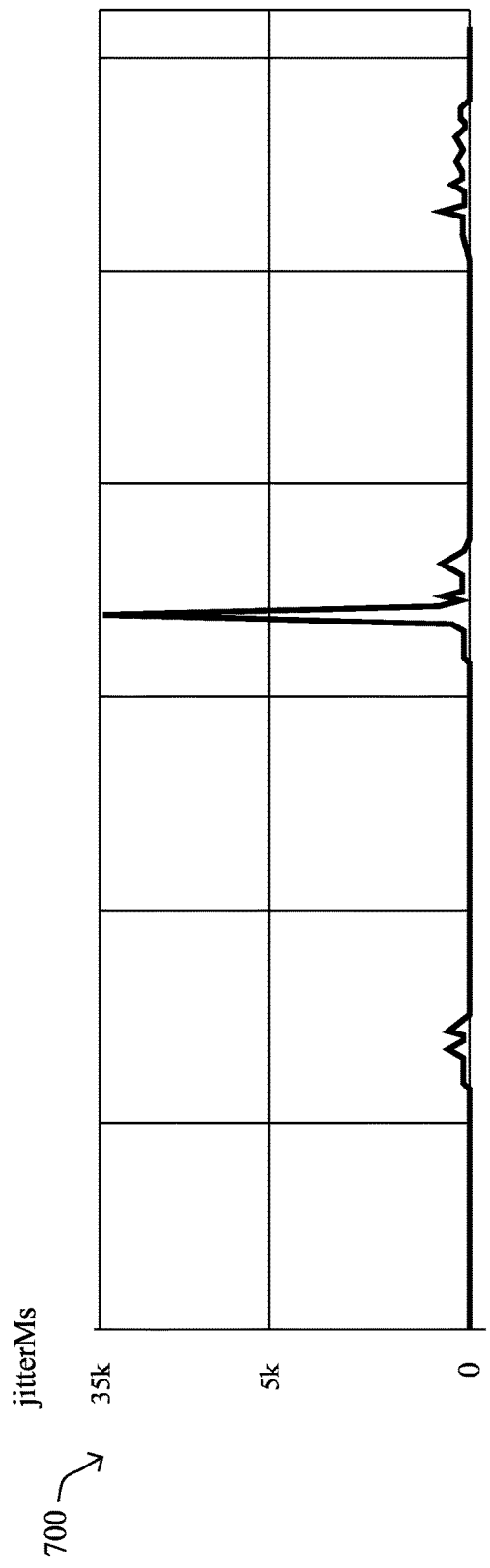
FIGS. 7A-7D illustrate example plots of path performance metrics.
Figure 7B:
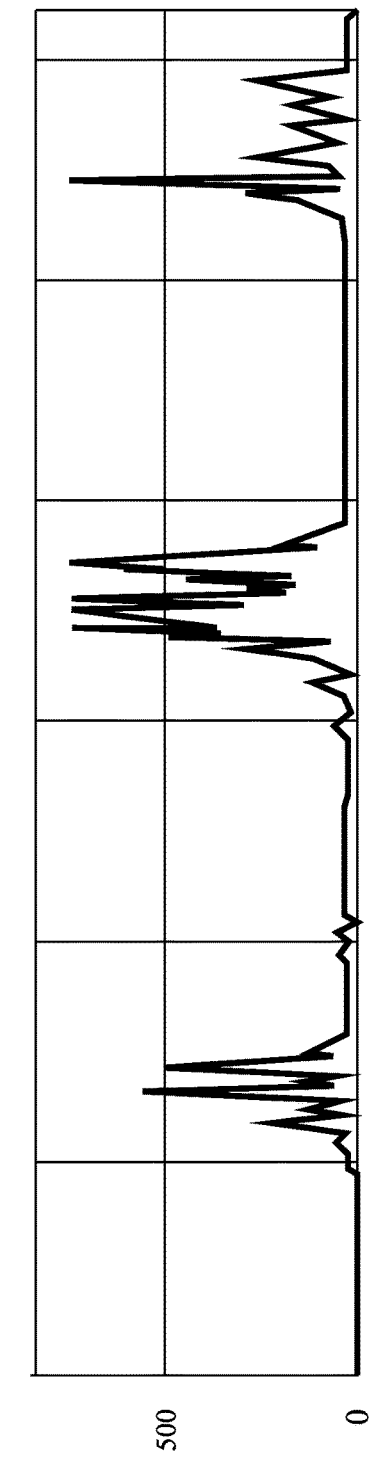
Figure 7C:
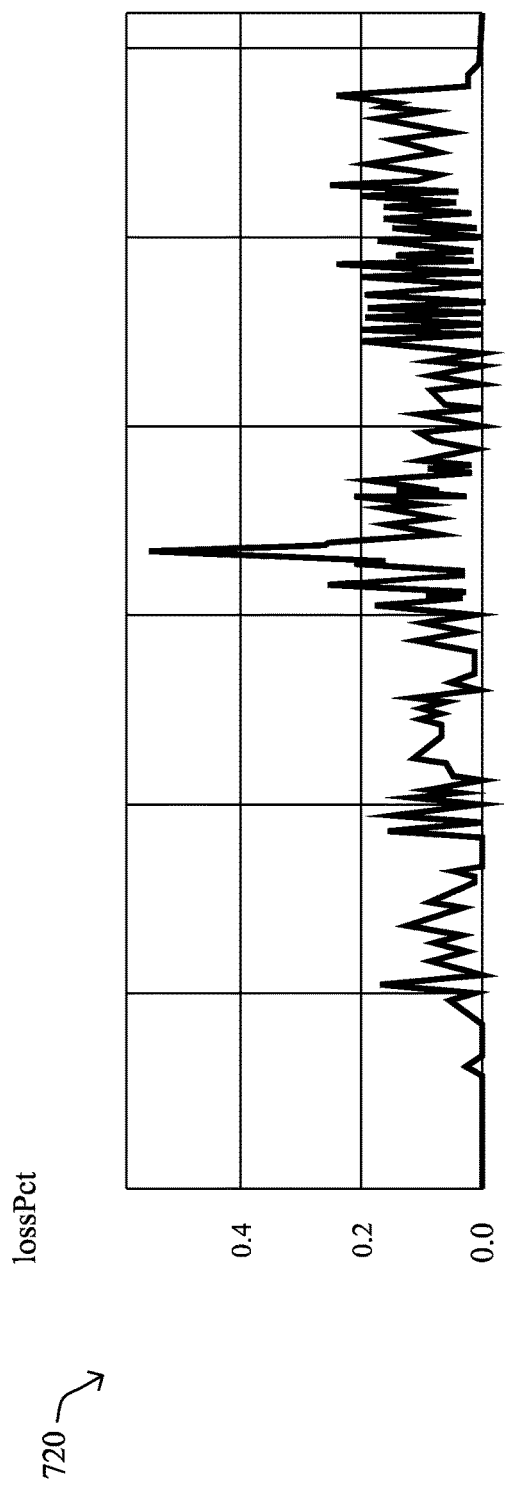
Figure 7D:
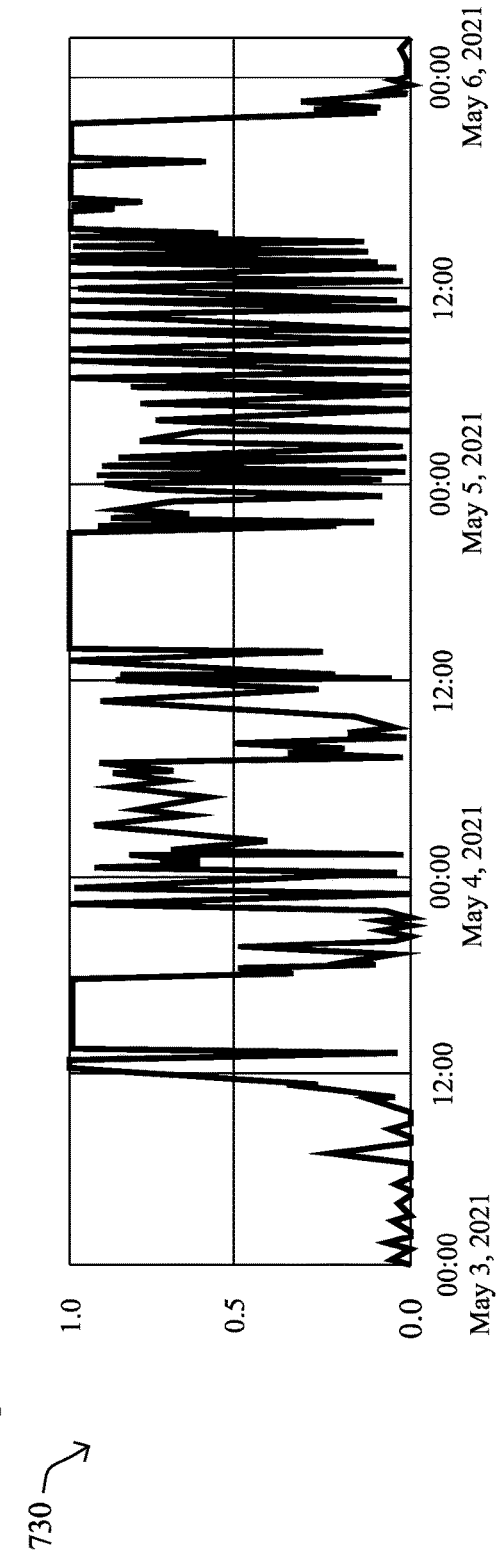

For example, consider an SLA template of loss <3%, latency <300 ms and jitter <50 ms with respect to the path performance metrics shown in FIGS. 7A-7D. More specifically, FIG. 7A illustrates an example plot 700 of the jitter along a certain path over time. FIG. 7B illustrates an example plot 710 of the latency along the path over time. FIG. 7C illustrates an example plot 720 of the loss fraction along the path over time. Finally, FIG. 7D illustrates an example plot 730 of the computed probability of the path violating its SLA over time. From plot 730, it can be seen that the probability of an SLA violation is very unstable and non-seasonal, meaning that the path oscillates between good and bad states.

Figure 8A:
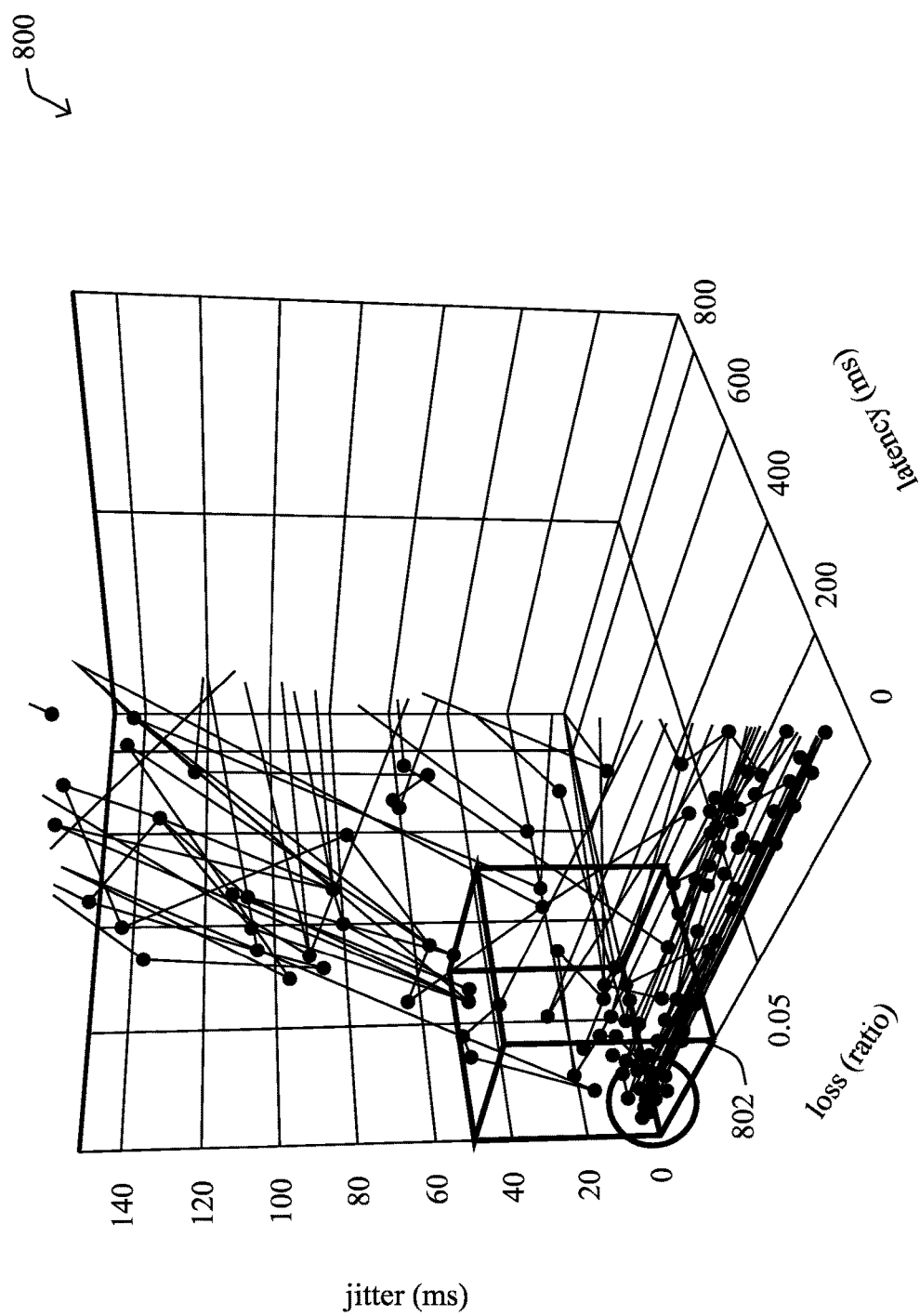
FIGS. 8A-8B illustrate example plots of a path oscillating between states.
Figure 8B:
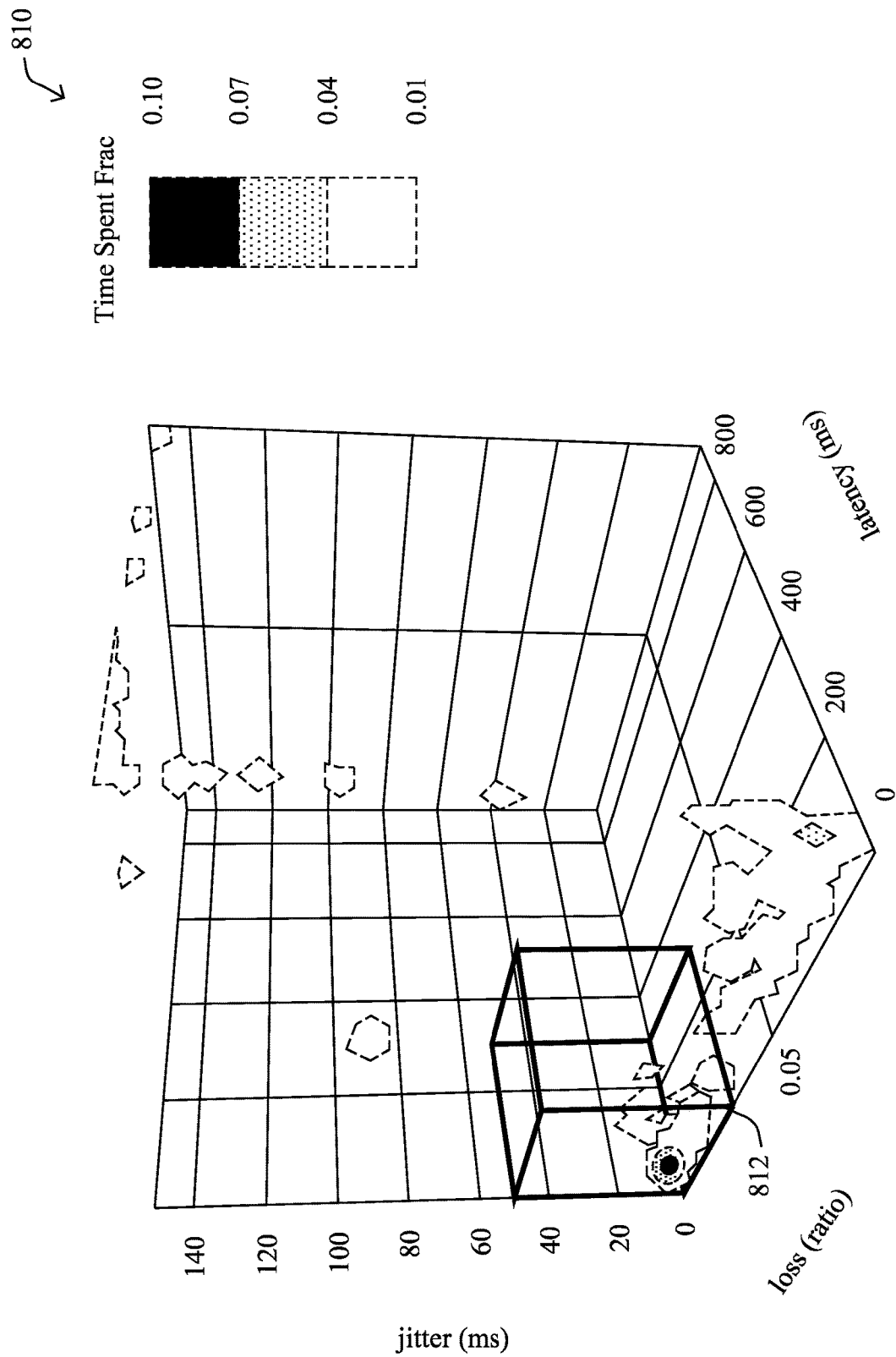

FIGS. 8A-8B illustrate example plots of a path oscillating between states. As noted above, oscillation analyzer 606 may assess a multi-dimensional plot of the performance metrics, to compute the oscillation score for a path. Plot 800 in FIG. 8A, for instance, shows a three dimensional plot of the jitter, loss, and latency of the path over time. The shaded cube 802 also shown represents the state of the path when it does not violate its SLA template and offers acceptable application performance (e.g., where loss <0.03 (3%), latency <300 ms, jitter <50 ms). Here, it can be seen that the performance of the path frequently switches from within cube 802 to outside of it, which represents a second state in which the application experience is unacceptable and there is an SLA violation. Note also that the core cause for these oscillations is mainly attributable to loss, with fewer violations being attributable to latency or jitter.

In order to assign an oscillation score to the path, oscillation analyzer 606 may base its computation on the number of times the lines cross the boundary of cube 802. For example, the oscillation score may be defined as the fraction of times the path has is crossed the boundary of cube 802 in the last x-number of hours. In other embodiments, the oscillation score may also take into account the lengths of these jumps (e.g., the distance in plot 800 past any given boundary crossing, which represents the intensity/severity of the oscillation.

FIG. 8B illustrates another example multi-dimensional plot 810 of the performance metrics of a given path, this time showing the time spent fraction for the metrics as a heatmap in plot 810. Similar to the previous case, plot 810 also shows cube 812 that represents the boundaries in the n-dimensional space defining the borders between the 'good' state and 'bad' state for the path. Hence, an oscillation-score and intensity-of-oscillations can be computed from the above n-dimensional analysis by oscillation analyzer 606. In some instances, oscillation analyzer 606 may further track "near" boundary oscillations in which the SLA was violated only by a slight margin (e.g., according to one or more parameters set by a user). These types of near boundary oscillations (NBOs) are particularly interesting, as they could potentially be addressed by making minor adjustments to the SLA template. Oscillation analyzer 606 may then store the oscillation scores, intensity of oscillation information, and the like, for each time period (e.g., hour of the day) and on a per-application basis.

Referring again to FIG. 6, path oscillation analysis process 249 may also include oscillation forecaster and avoider 608, which is responsible for making sure that the predictive routing engine does not opt to route over oscillating paths. Note that oscillation forecaster and avoider 608 may itself be implemented either as part of path oscillation analysis process 249 or directly as part of the predictive routing engine (e.g., as a component of predictive routing process 248).

In a simple embodiment, oscillation forecaster and avoider 608 may prohibit the predictive routing engine from selecting a path as an alternate route, if that path has a high oscillation score. In another embodiment, the timeseries of oscillation scores for the path could be used to train a forecasting model (e.g., an ARIMA model), to predict whether the path will exhibit a state oscillation in an upcoming time period (e.g., in the next hour). Such a model may be required if the path oscillates only during certain is periods (e.g., work-hours) and is stable during other hours. This predicted oscillation score can be used by the routing engine to check whether the path can be used as an alternate for any given time.

Path oscillation analysis process 249 may further include oscillation change detector 610, which is responsible for determining whether a given path has started or stopped exhibiting oscillating behaviors. Such a component may be triggered periodically or on demand, to assess whether the oscillation score has changed between two consecutive time periods. If there is a large enough change between the time periods, or from a period t versus the last n-number of time periods, then oscillation change detector 610 may update the oscillation scores and inform the routing engine that the path oscillation scores should be reconsidered.

Another potential component of path oscillation analysis process 249 is score informer 612, in various embodiments. During execution, score informer 612 is responsible for providing indications of the oscillating paths and their scores to the relevant edge routers. More specifically, for those paths deemed to be oscillating between good and bad states, score informer 612 may identify those edge routers associated with the paths and inform them of the oscillations, either directly or indirectly.

For instance, if a path between two edge-routers (tunnel) was deemed as having high oscillation score, then both of the edge routers may be informed of the oscillating tunnel. In contrast, if a path between an edge router and SaaS application via DIA path is oscillating, only the edge router at the client site may be informed. In turn, the notified edge router(s) may then consider the oscillation score of the path, so as to avoid routing application traffic over paths that are oscillating. This is useful for reactive routing protocols, such as Application Aware Routing (AAR), to avoid oscillations. In other embodiments, the predicted value of the oscillation score, as computed by oscillation forecaster and avoider 608, can be propagated to the edge router every time period or when the oscillation scores change significantly.

In some embodiments, path oscillation analysis process 249 may also include is oscillation explainer 614, which is responsible for showing the user the oscillations in the network and, potentially, an explanation as to why they are happening. More specifically, oscillation explainer 614 may provide information about an oscillating path (e.g., its identification information, path type, etc.), as well as its oscillation score for display to a network administrator or other user.

Figure 9:
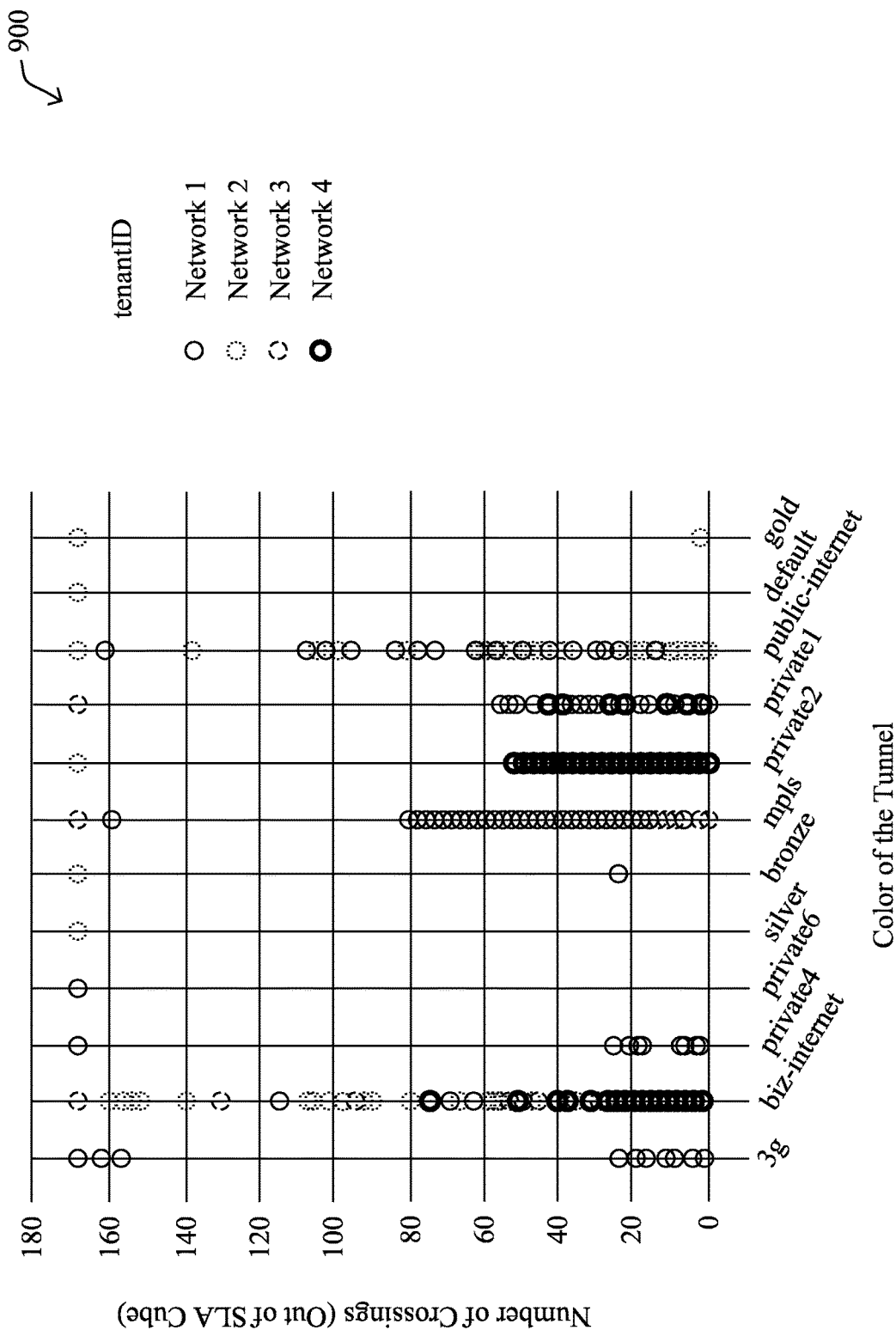
FIG. 9 illustrates an example user interface showing oscillations by different path types.

By way of example, FIG. 9 illustrates an example user interface 900 showing oscillations by different path types, in various embodiments. Here, path oscillations may be grouped and presented based on their corresponding networks and/or 'colors,' which represent their various types. Example path types may include, but are not limited to, business (biz) Internet-based paths, private paths, service provider performance tiers (e.g., bronze, silver, or gold tiers), public Internet, MPLS, cellular (e.g., 3G, 4G, 5G, etc.), a default type, or the like.

Here, a user may interact with user interface 900, such as by selecting the X-axis based on the path properties (e.g., color of the tunnel, country, etc.). The Y-axis thus shows the number of crossings of the SLA box in the multi-dimensional space (e.g., the computed oscillation scores). Each dot is one path, and the size of the dot signifies the mean SLA violations (the user may select some other metric to size or color of the dot). This will give the network administrator a tool to explore where the oscillations are commonly happening. For example, it can be seen in FIG. 9 that most of the oscillations are in the tunnels with color "biz-internet" and "public-internet," and not so much in the MPLS paths.

In some embodiments, an administrator may click on any given dot in user interface 900, to be presented with additional information about that path. For instance, selecting a given 'dot' on user interface 900 may present the user with a multi-dimensional plot of the metrics for that path, in a manner similar to plot 800 and plot 810 in FIGS. 8A-8B. In cases in which there are more than three such metrics, the user may be able to select up to three dimensions for the plot, to review where the SLA violations are occurring.

The user interface may also show the oscillating paths for which there are no alternate routes. In order to do this, oscillation explainer 614 may identify the subset of paths which exhibit oscillations and do not have any alternative paths (e.g., those with no oscillations) and display the SLA cubes and density cubes for such paths. The user may then reason (e.g., a path is oscillating due to loss) and take a corrective action so that there is at least one stable alternative route. For instance, the corrective action may be to add another path with another Service Provider (SP) or with a better transport/path type (e.g., MPLS), or to upgrade the existing transport to have lesser loss (e.g., if the problem is due to local connectivity with the SP).

Referring yet again to FIG. 6, path oscillation analysis process 249 may also include SLA adjuster 616, which can be used in both proactive and reactive routing systems. In general, SLA adjuster 616 may be operable to adjust an SLA template for a path that exhibits near boundary oscillations (NBOs). In effect, SLA adjuster 616 may redraw the SLA cube in the multi-dimensional plot (e.g., as in FIGS. 8A-8B), so as to limit the number of boundary crossings and/or their durations. For instance, by slightly increasing the value for the loss criterion of the SLA, this may dramatically reduce the number of oscillations and undesirable effect on the network, both in a reactive and in a predictive system.

In one embodiment, SLA adjuster 616 may provide the new boundary of the selected dimension for display to the user, such as part of a request to adjust the SLA. Such a request may also indicate the gains in doing so in terms of oscillation reductions for the path.

In another embodiment, the effect of such an adjustment may be correlated with the application feedback from the users of the application. For example, the User Experience Score (UES) within Webex may be used to reflect the user experience. SLA adjuster 616 may be capable of first adjusting the SLA boundary and then correlate the impact of such an adjustment on these UES. If it is shown that the number of oscillations is reduced while maintaining the same level of QoE for application, then the template can be safely adjusted, thus constituting a safe template adjustments.

Figure 10:
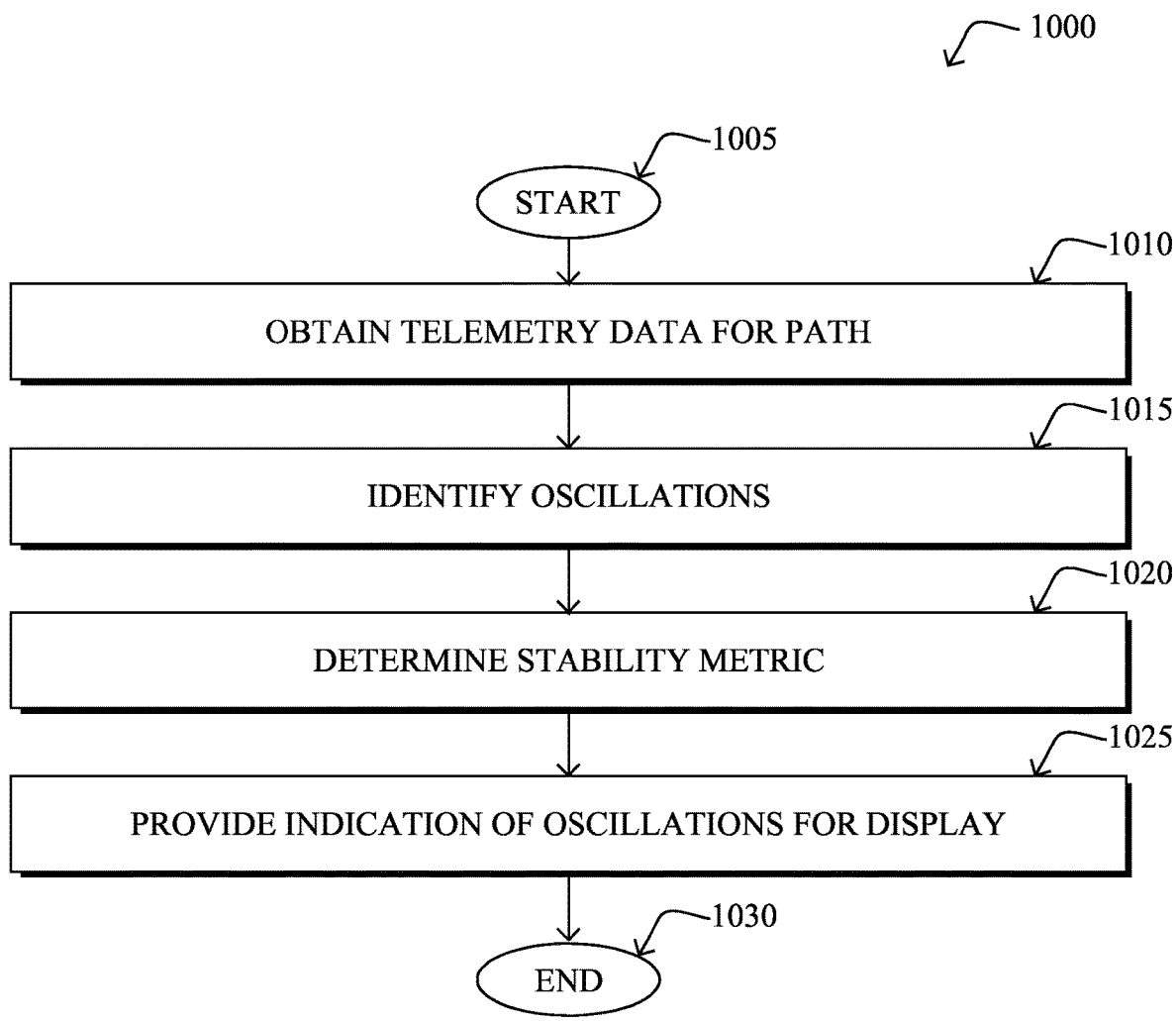
FIG. 10 illustrates an example simplified procedure for detecting path performance oscillations using path stability metrics.

FIG. 10 illustrates an example simplified procedure 1000 (e.g., a method) is procedure for detecting path performance oscillations using path stability metrics, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 1000 by executing stored instructions (e.g., path oscillation analysis process 249). The procedure 1000 may start at step 1005, and continues to step 1010, where, as described in greater detail above, the device may obtain telemetry data for a path in a network that is used to convey traffic associated with an online application. In some instances, the online application may be a SaaS application. In some embodiments, the telemetry data comprises at least one of: packet loss, delay, or jitter along the path in the network. In further embodiments, the telemetry data is indicative of at least one of: user satisfaction ratings for the online application.

At step 1015, as detailed above, the device may identify, based on the telemetry data, oscillations of the path between a first state in which the path provides acceptable user experience for the online application and a second state in which the path does not provide acceptable user experience for the online application. In one embodiment, the second state corresponds to the path violating a service level agreement associated with the online application. In other embodiments, the second state may correspond to user satisfaction ratings for the online application falling below a threshold level.

At step 1020, the device may determine a stability metric that quantifies the oscillations of the path, as described in greater detail above. In various embodiments, the stability metric is based in part on at least one of: a fraction or duration of time that the path spent in the second state, or an intensity of the oscillations.

At step 1025, as detailed above, the device may provide an indication of the oscillations of the path, based in part on the stability metric. In some embodiments, the indication is provided to a router or to a controller for the router, which causes the router to avoid routing the traffic associated with the online application via the path. In another embodiment, the indication is provided for display to a user and includes a multi-dimensional plot of transitions between the first state and the second state. In another embodiment, the device provides an indication for display that indicates a path type of the path associated with the oscillations. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for detecting path performance oscillations using path stability metrics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, telemetry data for a path in a network that is used to convey traffic associated with an online application;
   identifying, by the device and based on the telemetry data, oscillations of the path between a first state in which the path provides acceptable user experience for the online application and a second state in which the path does not provide acceptable user experience for the online application;
   determining, by the device, a stability metric that quantifies the oscillations of the path; and
   providing, by the device, an indication of the oscillations of the path, based in part on the stability metric.

2. The method as in claim 1, wherein the telemetry data comprises at least one of: packet loss, delay, or jitter along the path in the network.

3. The method as in claim 1, wherein the telemetry data is indicative of user satisfaction ratings for the online application.

4. The method as in claim 1, wherein the indication is provided to a router or to a controller for the router, which causes the router to avoid routing the traffic associated with the online application via the path.

5. The method as in claim 1, wherein the indication is provided for display to a user and includes a multi-dimensional plot of transitions between the first state and the second state.

6. The method as in claim 1, further comprising:
   providing, by the device, an indication for display that indicates a path type of the path associated with the oscillations.

7. The method as in claim 1, further comprising:
   providing, by the device, an indication for display that indicates that an alternate path does not exist onto which the traffic can be rerouted.

8. The method as in claim 1, wherein the second state corresponds to the path violating a service level agreement associated with the online application.

9. The method as in claim 1, wherein the stability metric is based in part on at least one of: a fraction or duration of time that the path spent in the second state, or an intensity of the oscillations.

10. The method as in claim 1, wherein the online application is a software-as-a-service (SaaS) application.

11. An apparatus, comprising:
    one or more network interfaces;
    a processor coupled to the one or more network interfaces and configured to execute one or more processes; and
    a memory configured to store a process that is executable by the processor, the process when executed configured to:
    obtain telemetry data for a path in a network that is used to convey traffic associated with an online application;
    identify, based on the telemetry data, oscillations of the path between a first state in which the path provides acceptable user experience for the online application and a second state in which the path does not provide acceptable user experience for the online application;
    determine a stability metric that quantifies the oscillations of the path; and
    provide an indication of the oscillations of the path, based in part on the stability metric.

12. The apparatus as in claim 11, wherein the telemetry data comprises at least one of: packet loss, delay, or jitter along the path in the network.

13. The apparatus as in claim 11, wherein the telemetry data is indicative of user satisfaction ratings for the online application.

14. The apparatus as in claim 11, wherein the indication is provided to a router or to a controller for the router, which causes the router to avoid routing the traffic associated with the online application via the path.

15. The apparatus as in claim 11, wherein the indication is provided for display to a user and includes a multi-dimensional plot of transitions between the first state and the second state.

16. The apparatus as in claim 11, wherein the process when executed is further configured to:
    provide an indication for display that indicates a path type of the path associated with the oscillations.

17. The apparatus as in claim 11, wherein the process when executed is further configured to:
provide an indication for display that indicates that an alternate path does not exist onto which the traffic can be rerouted.

18. The apparatus as in claim 11, wherein the second state corresponds to the path violating a service level agreement associated with the online application.

19. The apparatus as in claim 11, wherein the stability metric is based in part on at least one of: a fraction or duration of time that the path spent in the second state, or an intensity of the oscillations.

20. A tangible, non-transitory, computer-readable medium storing program instructions that cause a device to execute a process comprising:
obtaining, by the device, telemetry data for a path in a network that is used to convey traffic associated with an online application;
identifying, by the device and based on the telemetry data, oscillations of the path between a first state in which the path provides acceptable user experience for the online application and a second state in which the path does not provide acceptable user experience for the online application;
determining, by the device, a stability metric that quantifies the oscillations of the path; and
providing, by the device, an indication of the oscillations of the path, based in part on the stability metric.

\* \* \* \* \*

UNITED STATES PATENT AND TRADEMARK OFFICE
CERTIFICATE OF CORRECTION

| | |
|---|---|
| PATENT NO. | : 11,677,656 B1 |
| APPLICATION NO. | : 17/538173 |
| DATED | : June 13, 2023 |
| INVENTOR(S) | : Jean-Philippe Vasseur et al. |

It is certified that error appears in the above-identified patent and that said Letters Patent is hereby corrected as shown below:

In the Specification

Column 8, Line 11, please amend as shown:
core 402 and SD-WAN fabric 404. For instance, SD-WAN Column 8, Line 20, please amend as shown:
404. For instance, SDN controller 408 may be responsible Column 8, Line 49, please amend as shown:
workloads. On the network side, SD-WAN provides a high Column 8, Line 53, please amend as shown:
Internet with supporting multiple CoS, LTE, satellite links, Column 10, Line 25, please amend as shown:
herein as routing "patches," which are typically temporary in Column 11, Line 42, please amend as shown:
mines a stability metric that quantifies the oscillations of Column 12, Line 15, please amend as shown:
cally. In one embodiment, telemetry could be gathered by Column 13, Line 29, please amend as shown:
detection of path oscillations. For example, if a path was Column 14, Line 3, please amend as shown:
of times the path has crossed the boundary of cube 802 in Signed and Sealed this
Twelfth Day of September, 2023

*Katherine Kelly Vidal*
Katherine Kelly Vidal
*Director of the United States Patent and Trademark Office*

CERTIFICATE OF CORRECTION (continued)
U.S. Pat. No. 11,677,656 B1

Column 14, Line 46, please amend as shown:
may be required if the path oscillates only during certain Column 15, Line 19, please amend as shown:
249 may also include oscillation explainer 614, which is Column 16, Line 32, please amend as shown:
(e.g., a method) procedure for detecting path performance